Sept. 6, 1938.　　　　　R. COLE　　　　2,129,262
HEALTH APPARATUS
Filed May 7, 1935　　　2 Sheets-Sheet 1
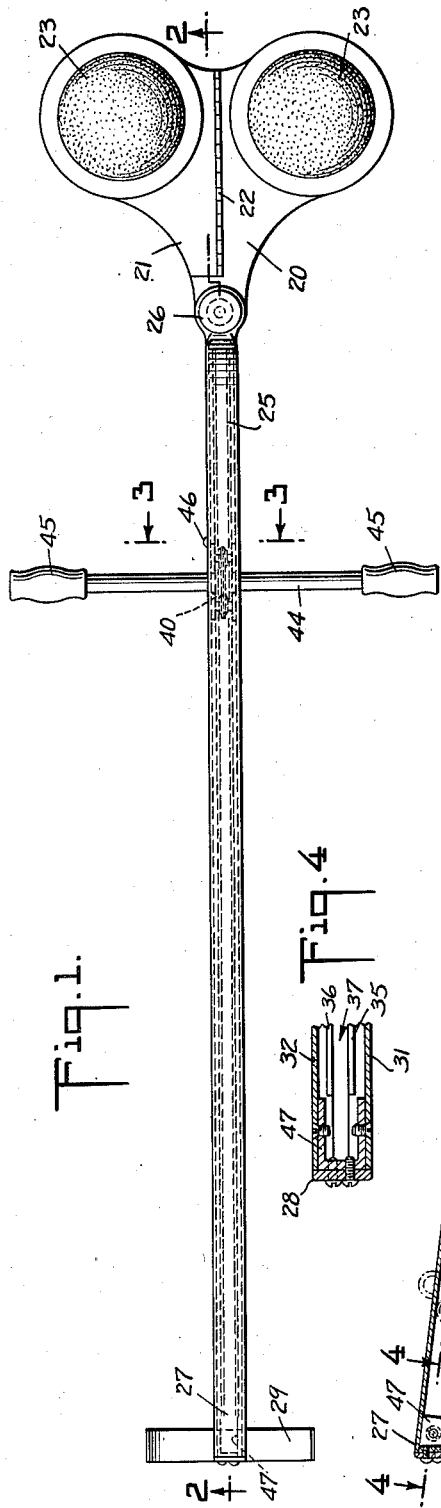
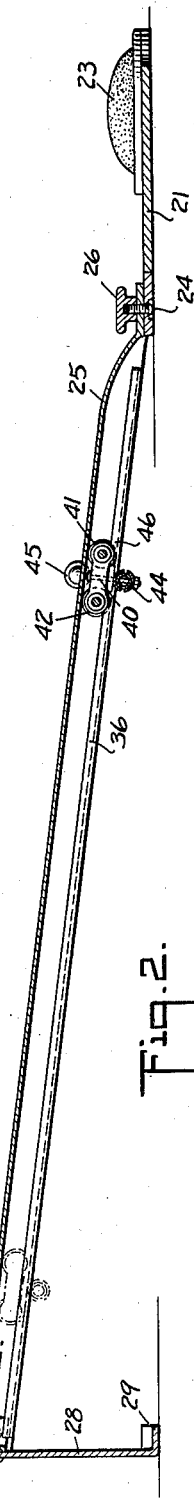
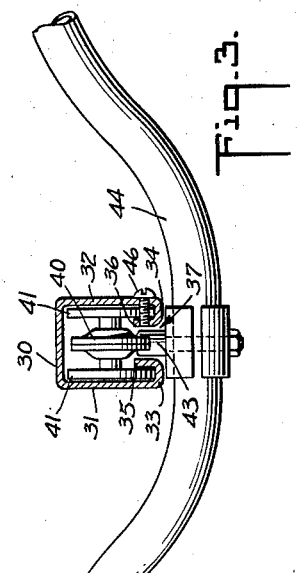
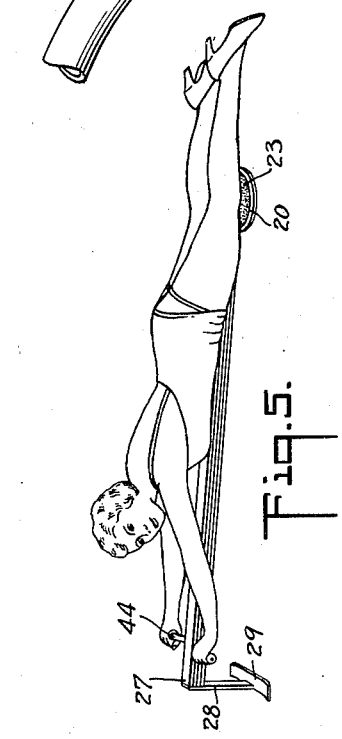
INVENTOR
Rex Cole
BY
ATTORNEY Sept. 6, 1938. R. COLE 2,129,262
HEALTH APPARATUS
Filed May 7, 1935 2 Sheets-Sheet 2
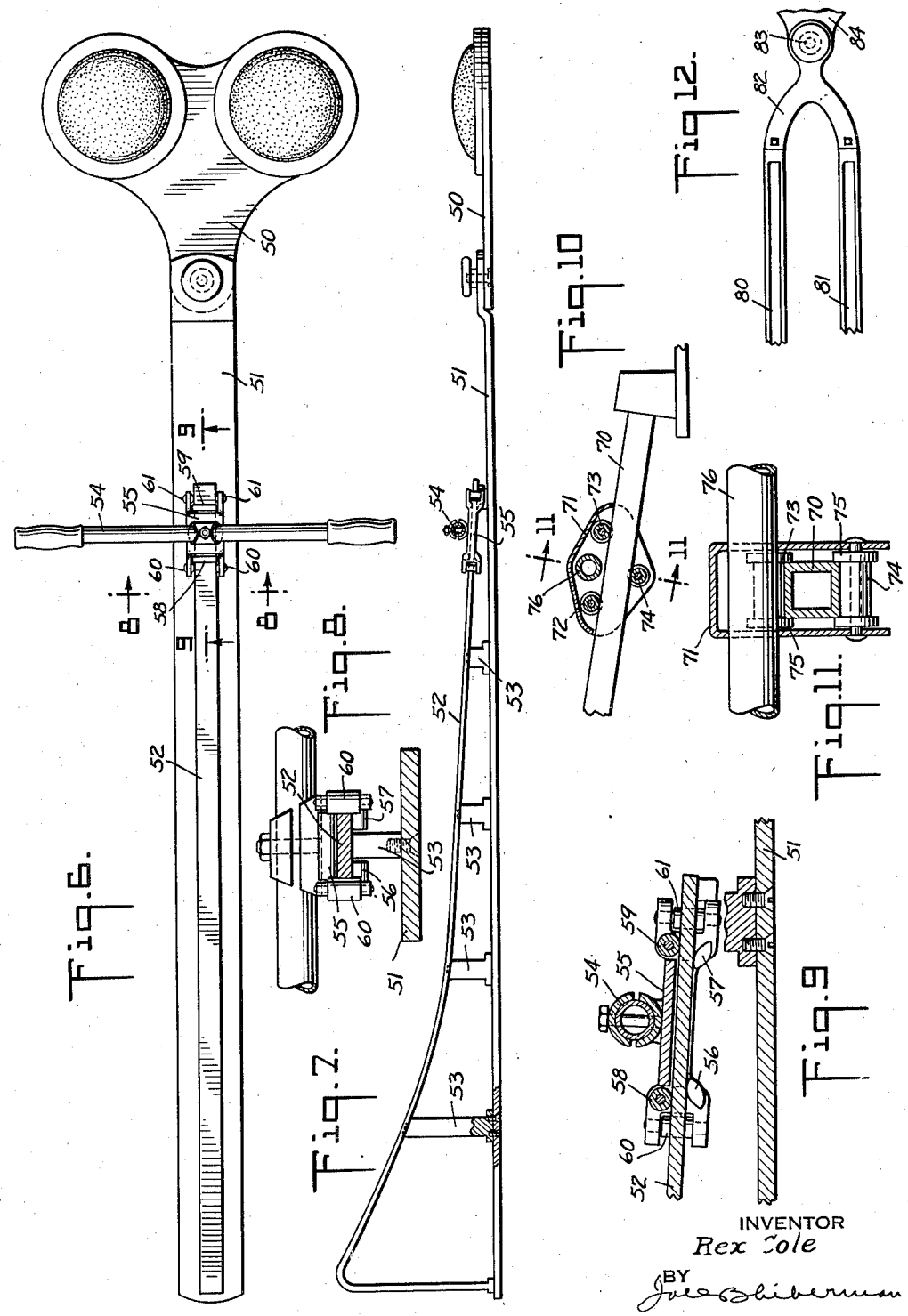
INVENTOR
Rex Cole
BY
ATTORNEY Patented Sept. 6, 1938

2,129,262

UNITED STATES PATENT OFFICE 2,129,262

HEALTH APPARATUS

Rex Cole, New York, N. Y.

Application May 7, 1935, Serial No. 20,130

4 Claims. (Cl. 272—57)

The present invention relates to health apparatus designed more particularly for strengthening and toning up the muscles of the abdomen, for reduction of girth, and for effecting relief from constipation.

The apparatus is adapted to be placed flat on the floor and is provided with a knee plate on which the user may kneel or crouch, a handle bar adapted to be grasped by the hands, and an inclined guide for the handle bar so arranged that the user may extend the body at full length while the bar moves along the guide away from the knee plate. The inclination of the guide facilitates the return from the prone position to the crouch position and insures that the handle bar will be at the lower end of the guide when at rest.

The accompanying drawings show, for purposes of illustrating the present invention, several embodiments in which the invention may take form, it being understood that the drawings are illustrative of the invention rather than limiting the same. In these drawings:

Fig. 1 is a top plan view of one form of health apparatus;

Fig. 2 is a sectional view on the line 2—2 of Figure 1;

Fig. 3 is a transverse sectional view on the line 3—3 of Figure 1;

Fig. 4 is a sectional view on the line 4—4 of Figure 2;

Fig. 5 is a perspective view illustrating the apparatus in use;

Fig. 6 is a view similar to Figure 1 showing a modified form of construction;

Fig. 7 is a side elevational view of the structure shown in Figure 6;

Figs. 8 and 9 are transverse and longitudinal sectional views on the lines 8—8 and 9—9 respectively of Figure 6;

Fig. 10 is a fragmentary view showing a modified form of construction;

Fig. 11 is a section taken on the line 11—11 of Figure 10; and

Fig. 12 is an inverted plan view of a still further modified form of construction.

In the form of construction shown in Figures 1 to 5 inclusive the knee plate is made up in two parts 20 and 21 hinged as indicated at 22 to permit folding one part under the other. Each part of the knee plate carries a kneeling pad indicated at 23.

One part of the knee plate 20 is provided with an upwardly extending screw 24 adapted to receive the lower end of a guide or extension 25. These parts are clamped together by a thumb nut 26. The outer end 27 of the guide 25 is supported on a vertical member 28 having an elongated foot 29 to provide proper stability for the structure and to permit easy swinging of the guide 25 about the pin 24 as a pivot.

The guide 25 is of channel shaped cross section as appears more clearly in Figure 3. It has a top wall 30, side walls 31 and 32, flanges 33 and 34 which may be bent upwardly as indicated at 35 and 36. These flanges are spaced to form a slot 37. The trolley, indicated generally at 40, is mounted inside the channel shaped guide, and has pairs of wheels 41 and 42 adapted to ride on the flanges 33 and 34. A connecting member 43 passes from the trolley down through the slot 37 to support a transversely extending handle bar 44 having grips indicated at 45. A stop screw 46 limits the downward movement of the trolley along the guide. The upper end of the guide is closed off by a U-shaped member 47 suitably secured to the channel and this member is secured to the support 28.

When the apparatus is set up on the floor it assumes the position indicated in Figures 1 and 2 and suitable adjustment may be made by swinging the guide relative to the knee plate so that the guide extends to the right or left. When it is in this position the user places the knees on the knee pad and grasps the handle bar with the hands. The user is in a crouching or kneeling position and then moves the arms so as to push the handle bar toward the upper or remote end of the guide. This brings the person to the prone position indicated in Figure 5. To return to the crouch position the user pulls backward on the handle bar and this movement is facilitated by the inclination of the guide.

In the form shown in Figures 6 to 9 inclusive, the knee plate indicated at 50 is pivotally secured to an extension 51. The knee plate and extension are adapted to rest flat on the floor as indicated in Figure 7. The guide indicated at 52 is in the form of a metal strap bent as indicated to have an increasing slope as the farther end is approached. This strap is supported by spacers indicated at 53.

The handle bar is here indicated at 54. It is secured on a carriage or trolley 55 having inwardly extending lugs 56 and 57, upper rollers 58 and 59, and side rollers 60 and 61, and movable back and forth along the guide 52. Owing to the greater steepness of the remote end of the inclined guide, the guide is more effective in facilitating the return to the crouch position of tall users than of short users.

In the form of construction shown in Figures 10 and 11 the inclined guide is in the form of a piece of square tubing or rod 70 and the trolley is in the form of a casing 71 having two upper rollers 72 and 73 and a single lower roller 74. These rollers are flanged as indicated at 75 so as to receive the guide and keep the handle bar 76 in position.

In the form shown in Figure 12 two parallel guides are employed as indicated at 80 and 81. These guides are connected to a Y-shaped yoke 82 pivoted at 83 to the knee plate 84.

It is obvious that the invention may be embodied in many forms and constructions within the scope of the claims, and I wish it to be understood that the particular form shown are but a few of the many forms. Various modifications and changes being possible, I do not otherwise limit myself in any way with respect thereto.

What is claimed is:

1. A health building apparatus adapted to be rested flat on the floor and comprising a knee plate, an upwardly inclined elongated guide secured to the knee plate and having a support extending to the floor, and a transversely extending handle bar, a handle bar supporting trolley reciprocable along said guide, the trolley being housed within the guide and the guide being open at the bottom to accommodate the connection between the trolley and handle bar, the parts being so dimensioned that the user kneeling on the knee plate can move the handle bar from the near position which brings the body into a crouch to a far position which stretches the body at full length, the inclined guide facilitating the return to the crouch position.

2. A health building apparatus adapted to be rested flat on the floor and comprising a knee plate, an upwardly inclined elongated guide secured to the plate and having a support extending to the floor, the guide being of channel cross section and having inwardly extending flanges along its lower edge spaced apart to form a slot, a transversely extending handle bar, a trolley having wheels riding on the flanges, and a handle bar support passing through said slot.

3. A health building apparatus adapted to be rested flat on the floor and comprising a knee plate, an upwardly inclined elongated guide secured to the knee plate and having a support extending to the floor, and a transversely extending handle bar, a handle bar supporting trolley reciprocable along said guide the trolley having a cross member under the guide, the parts being so dimensioned that the user kneeling on the knee plate can move the handle bar from the near position which brings the body into a crouch to a far position which stretches the body at full length, the inclined guide facilitating the return to the crouch position.

4. A health building apparatus adapted to be rested flat on the floor and comprising a knee plate, an upwardly inclined elongated guide secured to the knee plate and having a support extending to the floor, and a transversely extending handle bar, a handle bar supporting trolley reciprocable along said guide, the parts being so dimensioned that the user kneeling on the knee plate can move the handle bar from the near position which brings the body into a crouch to a far position which stretches the body at full length, the inclined guide facilitating the return to the crouch position.

REX COLE.